(12) United States Patent
Horibe et al.

(10) Patent No.: US 11,420,597 B2
(45) Date of Patent: Aug. 23, 2022

(54) RECEIVING/TRANSMITTING DEVICE FOR VEHICLE

(71) Applicant: TOYODA GOSEI CO., LTD., Kiyosu (JP)

(72) Inventors: Hitoshi Horibe, Kiyosu (JP); Takeshi Kondo, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 42 days.

(21) Appl. No.: 16/980,893

(22) PCT Filed: Feb. 18, 2019

(86) PCT No.: PCT/JP2019/005854
§ 371 (c)(1),
(2) Date: Sep. 15, 2020

(87) PCT Pub. No.: WO2019/187774
PCT Pub. Date: Oct. 3, 2019

(65) Prior Publication Data
US 2021/0009086 A1    Jan. 14, 2021

(30) Foreign Application Priority Data

Mar. 30, 2018 (JP) .............................. JP2018-068559

(51) Int. Cl.
*B60S 1/52* (2006.01)
*B60R 13/00* (2006.01)
(Continued)

(52) U.S. Cl.
CPC .............. *B60S 1/52* (2013.01); *B60R 13/005* (2013.01); *B60S 1/60* (2013.01); *G08C 17/02* (2013.01);
(Continued)

(58) Field of Classification Search
CPC .... B60S 1/52; B60S 1/60; B60S 1/566; B60R 13/005; B60R 1/0602; B60R 11/04;
(Continued)

(56) References Cited

U.S. PATENT DOCUMENTS

| 9,452,739 B2 | 9/2016 | Kikuta et al. |
| 2015/0040953 A1 | 2/2015 | Kikuta et al. |

(Continued)

FOREIGN PATENT DOCUMENTS

| JP | 2015-057338 A | 3/2015 |
| JP | 2017-528358 A | 9/2017 |

OTHER PUBLICATIONS

International Search Report of the International Searching Authority dated Apr. 9, 2019 for the corresponding International application No. PCT/JP2019/005854 (and English translation).

*Primary Examiner* — Hai Phan
*Assistant Examiner* — Anthony D Afrifa-Kyei
(74) *Attorney, Agent, or Firm* — Posz Law Group, PLC (57) ABSTRACT

Provided is a receiving/transmitting device for vehicle that inhibits applied cleaning liquid from spoiling an outer appearance of a vehicle. A receiving/transmitting device for vehicle of the present invention includes: a receiver/transmitter configured to receive and/or transmit a radio wave; a transmissive cover positioned so as to be fixed relative to the receiver/transmitter; a receiver/transmitter moving unit configured to cause the cover and the receiver/transmitter to reciprocate between a receiving/transmitting position and a cleaning position; and a nozzle device configured to eject cleaning liquid toward the surface of the cover when the receiver/transmitter is at the cleaning position.

7 Claims, 5 Drawing Sheets

(51) Int. Cl.
*B60S 1/60* (2006.01)
*G08C 17/02* (2006.01)
*G01S 7/40* (2006.01)
*G01S 7/497* (2006.01)

(52) U.S. Cl.
CPC .............. *G01S 7/40* (2013.01); *G01S 7/4043* (2021.05); *G01S 7/497* (2013.01); *G01S 2007/4977* (2013.01)

(58) Field of Classification Search
CPC ...... B60R 2011/004; B60R 2300/8093; G08C 17/02; G01S 7/4043; G01S 7/40; G01S 7/497; G01S 2007/4977; G02B 27/0006; G02B 1/00; G02B 26/00; G02B 30/00; G03B 11/00; G03B 9/10; H04N 5/2252; H04N 5/2254
See application file for complete search history.

(56) References Cited

U.S. PATENT DOCUMENTS

2017/0088062 A1\* 3/2017 Lee .................. B60R 11/04
2017/0210304 A1 7/2017 Davies et al.
2017/0313288 A1\* 11/2017 Tippy ................ B60R 1/0602

\* cited by examiner

RECEIVING/TRANSMITTING DEVICE FOR VEHICLE

CROSS REFERENCE TO RELATED APPLICATIONS

This application is a U.S. national stage of International Patent Application No. PCT/JP2019/005854 filed on Feb. 18, 2019 and is based on Japanese Patent Application No. 2018-068559 filed on Mar. 30, 2018, the contents of which are incorporated herein by reference.

TECHNICAL FIELD

The present invention relates to a receiving/transmitting device for vehicle that allows removal of foreign matter adhering to a surface, in the receiving/transmitting direction, of a receiver/transmitter mounted to a vehicle.

BACKGROUND ART

A vehicle has been required to obtain a situation around the vehicle. For example, a vehicle is equipped with a camera (on-vehicle camera) for receiving visible light and taking a video image of the surrounding situation in order to obtain the situation around the vehicle. In the on-vehicle camera, foreign matter such as mud sometimes adheres to a surface of a lens during bad weather such as rainy weather. When there is foreign matter adhering to the surface of the lens, taking a clear video image of the surrounding situation becomes difficult.

The foreign matter adhering to the surface of the lens is removed by an external imaging surface (surface of the lens) being cleaned by the on-vehicle optical sensor cleaning device disclosed in, for example, Patent Literature 1. In the on-vehicle optical sensor cleaning device, fluid (cleaning liquid) is ejected toward the external imaging surface (surface of the lens) to clean the surface.

CITATION LIST

Patent Literature

Patent Literature 1: JP2015-057338A

SUMMARY OF INVENTION

Technical Problem

However, a conventional on-vehicle camera is fixed to a vehicle in a state where the external imaging surface is exposed to the outside of the vehicle. In this state, when cleaning liquid is applied to the external imaging surface to clean the surface, the applied cleaning liquid flows down along the surface of the vehicle (the surface of the body). That is, traces of the flow of the cleaning liquid remain on the surface of the vehicle body, to spoil the outer appearance of the vehicle.

The present invention has been made in view of the aforementioned circumstances, and an object of the present invention is to provide a receiving/transmitting device for vehicle that inhibits applied cleaning liquid from spoiling the outer appearance of the vehicle.

Solution to Problem

In order to overcome the aforementioned problem, a receiving/transmitting device for vehicle of the present invention includes: a receiver/transmitter mounted to a vehicle and configured to receive and/or transmit a radio wave; a transmissive cover configured to transmit the radio wave therethrough and positioned on a front side in a receiving/transmitting direction of the receiver/transmitter so as to be fixed relative to the receiver/transmitter; a receiver/transmitter moving unit mounted to the vehicle and configured to cause the cover and the receiver/transmitter to reciprocate between a receiving/transmitting position at which a surface of the cover is arranged along a surface of the vehicle, and a cleaning position at which the surface of the cover is positioned forward or rearward of the surface of the vehicle in the receiving/transmitting direction so as to be distant from the surface of the vehicle over a predetermined distance; and a nozzle device mounted to the vehicle and configured to eject cleaning liquid toward the surface of the cover when the receiver/transmitter is at the cleaning position.

In the receiving/transmitting device for vehicle of the present invention, when the receiver/transmitter is at the cleaning position, the nozzle device ejects cleaning liquid toward the surface of the cover. At the cleaning position, the surface of the cover is positioned forward or rearward of the surface of the vehicle in the receiving/transmitting direction so as to be distant from the surface of the vehicle over a predetermined distance. In such a structure, when cleaning liquid is ejected toward the surface of the cover, foreign matter on the surface of the cover is removed, and the surface of the cover is cleaned. When cleaning liquid is applied, the surface of the cover is positioned (at the cleaning position) so as to be distant from the surface of the vehicle (the surface of the body) over a predetermined distance. The cleaning liquid applied to the surface of the cover flows down from the surface of the cover. Since the surface of the cover is at the cleaning position, the cleaning liquid that flows down from the surface of the cover does not flow down directly onto the surface of the vehicle (the surface of the body). That is, cleaning liquid is inhibited from flowing along the surface of the vehicle (the surface of the body). According to the present invention, traces of the flow of cleaning liquid are inhibited from remaining on the body surface of the vehicle, and the cleaning liquid is inhibited from spoiling the outer appearance of the vehicle.

The receiver/transmitter of the present invention is a device used for obtaining a situation around the vehicle, and receiving and transmitting a radio wave. The radio wave propagates through a space around the vehicle. Examples of the radio wave include visible light and invisible light such as a sonic wave, an ultrasonic wave, a millimeter wave, an electromagnetic wave, an infrared ray, and an ultraviolet ray. Examples of the receiver/transmitter include a camera for taking a video image (imaging) of a portion around the vehicle, and a receiver/transmitter for receiving and transmitting light rays (electromagnetic wave) of invisible light such as an ultrasonic wave, a millimeter wave, a microwave, and an electromagnetic wave.

The receiving/transmitting direction of the receiver/transmitter represents the front-rear direction on the receiving/transmitting surface on which the receiver/transmitter receives and transmits a radio wave. The forward direction of the receiving/transmitting direction represents a direction away from the receiver/transmitter in the receiving/transmitting direction. The backward direction of the receiving/transmitting direction represents the direction opposite to the forward direction of the receiving/transmitting direction.

DESCRIPTION OF EMBODIMENTS

A receiving/transmitting device for vehicle of the present invention will be specifically described below according to embodiments. In the embodiments, the receiving/transmitting device for vehicle of the present invention is applied to an on-vehicle camera device. The embodiment represents one mode for specifically describing the present invention, and the present invention is not limited to the embodiments.

Embodiment 1

The present embodiment represents a camera device for vehicle 1 (hereinafter, referred to as camera device 1) having the structure shown in FIG. 1 to FIG. 3. The camera device 1 of the present embodiment receives visible light from behind a vehicle, and takes an image of the scene behind the vehicle according to the result of the reception. The camera device 1 of the present embodiment is used to display a taken video image representing a portion behind the vehicle, in the vehicle interior (for example, on a rearview mirror, a monitor, or the like).

Figure 1:
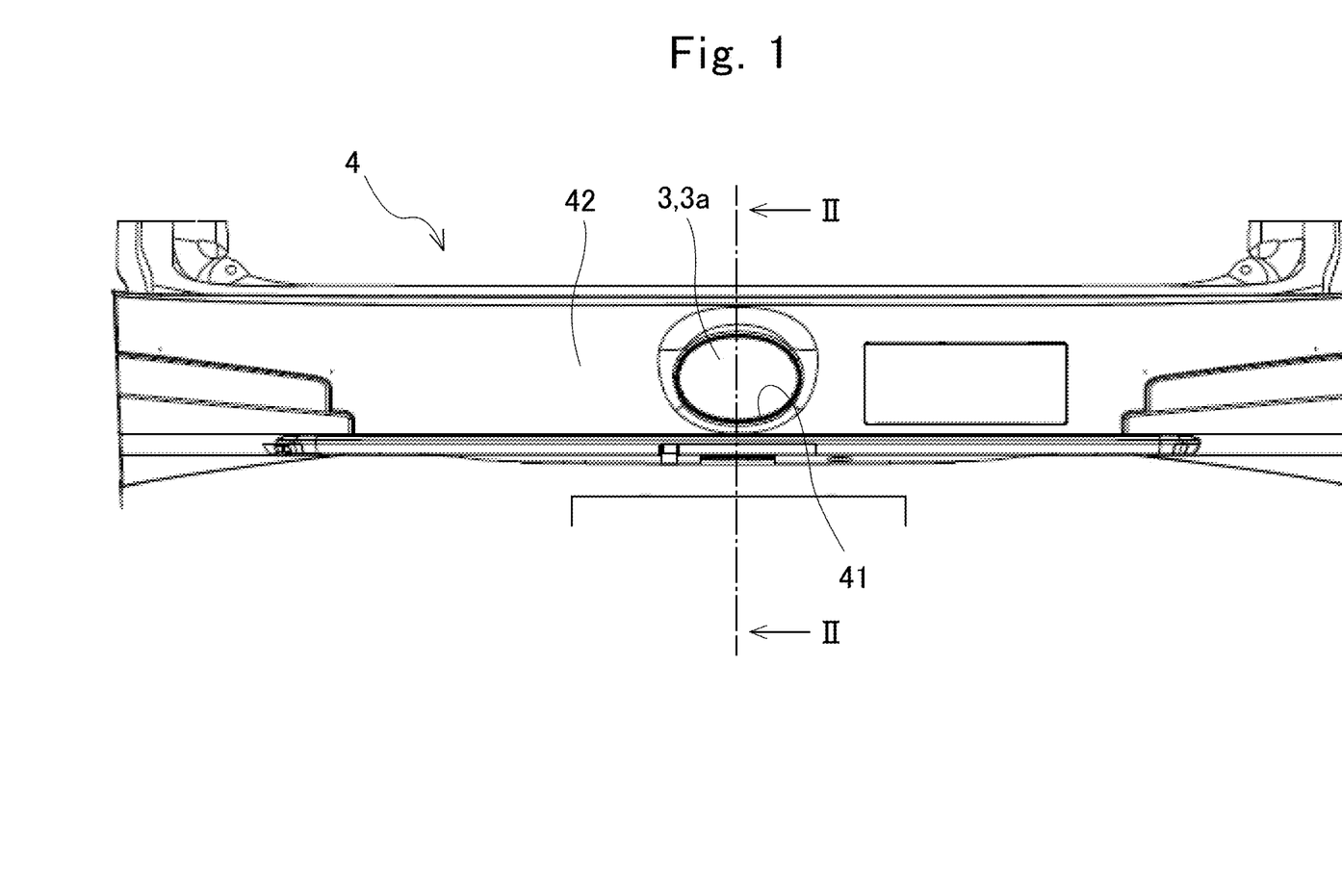
FIG. 1 is a rear view of the vehicle, illustrating a portion near a rear emblem of a vehicle to which a camera device according to embodiment 1 is mounted.

FIG. 1 is a rear view of a vehicle, illustrating a portion near a rear emblem of the vehicle having the camera device 1 mounted therein. FIG. 2 and FIG. 3 are cross-sectional views on surfaces along the vertical direction and the imaging direction, illustrating the structure of the camera device 1. FIG. 2 and FIG. 3 are each a sectional view as seen from the direction of arrows II-II in FIG. 1. FIG. 2 is a cross-sectional view of a camera disposed at an imaging position. FIG. 3 is a cross-sectional view of the camera disposed at a cleaning position.

Figure 2:
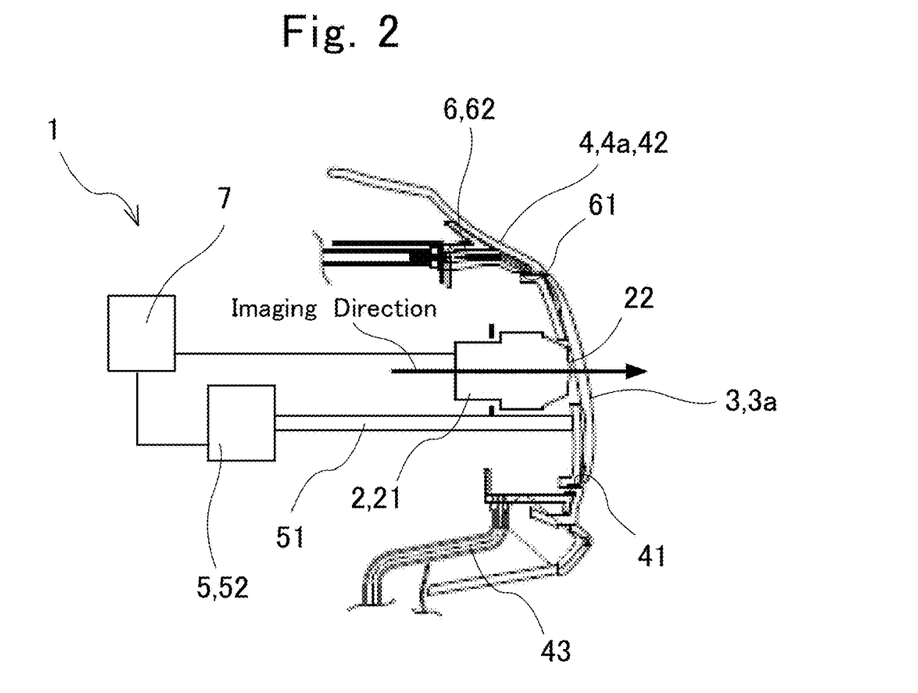
FIG. 2 is a sectional view as seen from the direction of arrows II-II in FIG. 1 when a camera of the camera device according to embodiment 1 is at an imaging position.
Figure 3:
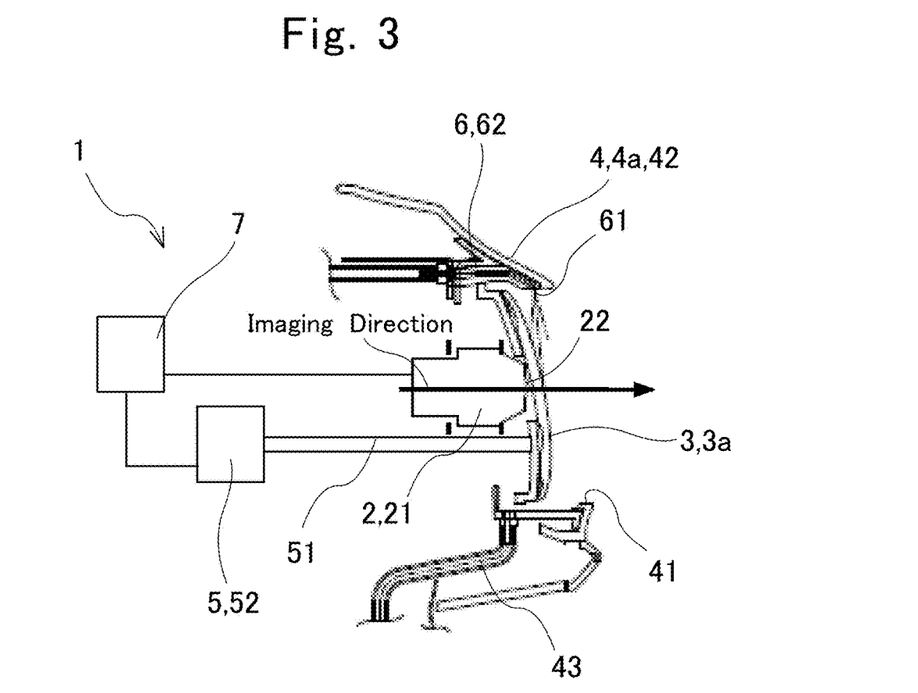
FIG. 3 is a sectional view as seen from the direction of arrows II-II in FIG. 1 when the camera of the camera device according to embodiment 1 is at a cleaning position.

The camera device 1 includes a camera 2, a rear emblem 3, a vehicle body 4, a camera moving unit 5, a cleaning nozzle 6, and a control unit 7, as shown in FIG. 1 to FIG. 3. The camera device 1 is disposed in the rear portion (specifically, in a portion above a number plate on the rear surface (surface in the backward direction relative to the vehicle advancing direction) of the vehicle) of the vehicle, as shown in FIG. 1 to FIG. 3.

The camera 2 corresponds to a receiver/transmitter of the present invention, and takes a video image of a portion behind the vehicle. The imaging direction of the camera 2 is the front-rear direction of the vehicle. The imaging direction corresponds to a receiving/transmitting direction in the present invention. The camera 2 of the present embodiment uses visible light for taking an image. The visible light corresponds to a radio wave in the present invention. The camera 2 includes a camera body 21 and a lens 22.

The camera body 21 is a device having an imaging element stored therein. The camera body 21 is disposed in a state where the imaging element for receiving visible light is oriented in the rear direction of the vehicle. That is, the camera 2 of the present embodiment is disposed such that the imaging direction of the camera 2 is the rear direction of the vehicle. The lens 22 is a member that is disposed on the front side, in the imaging direction, of the imaging element and is integrated with the camera body 21. The structures of the camera body 21 and the lens 22 of the camera 2 are not limited to any specific ones. For example, a camera body and a lens of a conventional on-vehicle camera are used.

The camera 2 is held by a camera holding member 51 of the camera moving unit 5 described below.

The camera body 21 has a transmitting device (not shown) for transmitting an image (result of imaging, result of reception) taken by the imaging element, to another device disposed in the vehicle. A situation behind the vehicle is detected (obtained) by transmitting an image (result of imaging) taken by the transmitting device to another device. Examples of the other device include a device such as a monitor or a rearview mirror (room mirror) which is disposed in the vehicle interior and visually checked by a person in the vehicle, and a device, such as a calculating unit, e.g., an ECU mounted in the vehicle, for calculating a situation around the vehicle. In the present embodiment, a result of imaging is transmitted to the control unit 7 and is further transmitted to another device.

The rear emblem 3 corresponds to a cover of the present invention, and is a light-transmissive member disposed forward of the lens 22 in the imaging direction. A surface 3a of the rear emblem 3 faces a portion behind the vehicle, and the surface 3a and a surface 4a of the vehicle body 4 form the outer peripheral surface of the vehicle. The rear emblem 3 forms a part of a garnish 42 that decorates the outer peripheral surface of the vehicle. In the present embodiment, a conventional rear emblem formed so as to have light transmitting properties is used for the rear emblem 3. In the present embodiment, the rear emblem 3 is structured to have a design layer of a half mirror structure on the back surface of a transparent resin plate. In the present embodiment, the rear emblem 3 has light transmitting properties as a whole.

Similar to the camera 2, the rear emblem 3 is held (fixed) by the camera holding member 51 of the camera moving unit 5. A distance between the rear emblem 3 and the camera 2 is fixed in a state where the rear emblem 3 and the camera 2 are held by the camera holding member 51 of the camera moving unit 5. Although the distance between the rear emblem 3 and the camera 2 is not limited to any specific distance, the distance is preferably set such that the imaging element of the camera body 21 receives light transmitted through the rear emblem 3 and takes a video image of a portion behind the vehicle. The distance is preferably short so as to downsize the body of the camera device 1.

The vehicle body 4 forms the outer peripheral surface of the vehicle. The body 4 has a hole 41 that is opened so as to correspond to the rear emblem 3. The surface 4a of the vehicle body 4 has the decorative garnish 42. The hole 41 is opened in the garnish 42. In the vehicle body 4, the camera device 1 is stored and fixed on the vehicle inner side of the surface 4a. Specifically, the outer peripheral surface of the vehicle body 4 is formed by a metal plate or a resin member. In the present embodiment, the camera device 1 is fixed to the vehicle inside the vehicle by the metal plate or the resin member that forms the vehicle body 4. In this structure, in the camera device 1 of the present embodiment, members other than the rear emblem 3 having the design layer are not exposed on the surface 4a of the vehicle body 4.

The hole 41 that is opened in the vehicle body 4 has a slightly smaller shape than that of the rear emblem 3 so as to correspond to the rear emblem 3. When the rear emblem 3 is at the imaging position described below, the edge portion of the surface 3a of the rear emblem 3 and the opening edge portion of the hole 41 are in close contact with each other. Thus, the edge portion and the opening edge portion are in close contact with each other in a liquid-tight state to inhibit water or foreign matter from passing therebetween.

The vehicle body 4 has a waste liquid flow path 43 from which cleaning liquid dropping from the surface 3a of the rear emblem 3 is discharged to the outside of the vehicle. The waste liquid flow path 43 is opened at one end below the surface 3a of the rear emblem 3 at the cleaning position. The waste liquid flow path 43 inhibits the dropping cleaning liquid from being dispersed in the vehicle body 4.

The camera moving unit 5 moves the camera 2 and the rear emblem 3 between the imaging position and the cleaning position.

The imaging position represents a position at which the surface 3a of the rear emblem 3 is arranged along the surface 4a of the vehicle body 4 as shown in FIG. 2. At this position, the rear emblem 3 forms a part of the design of the garnish 42 that decorates the outer peripheral surface of the vehicle. The imaging position corresponds to a receiving/transmitting position in the present invention.

The cleaning position represents a position at which the surface 3a of the rear emblem 3 is positioned inward (that is, on the rear side in the imaging direction) of the surface 4a of the vehicle body 4 inside the vehicle so as to be distant from the surface 4a of the vehicle body 4 over a predetermined distance, as shown in FIG. 3. The predetermined distance is set so as to allow the cleaning nozzle 6 described below to apply cleaning liquid to the surface 3a of the rear emblem 3.

The camera moving unit 5 corresponds to a receiver/transmitter moving unit of the present invention, and causes the camera 2 and the rear emblem 3 to reciprocate between the imaging position and the cleaning position. Specifically, the camera moving unit 5 includes the camera holding member 51 for holding the camera 2 and the rear emblem 3, and an actuator 52 for moving the camera holding member 51 in the imaging direction.

The camera holding member 51 holds the rear emblem 3 and the camera body 21 so as to fix the distance therebetween.

The actuator 52 moves the camera holding member 51 in the imaging direction.

The camera moving unit 5 connects to the control unit 7. The control unit 7 operates the actuator 52 when an instruction (signal) is inputted from, for example, a person in the vehicle interior or an ECU mounted to the vehicle. That is, the camera moving unit 5 shifts the camera 2 and the rear emblem 3 between the imaging position and the cleaning position according to a signal from the control unit 7. In the present embodiment, the camera 2 and the rear emblem 3 are held at the imaging position, and the camera 2 and the rear emblem 3 are shifted to the cleaning position when an instruction (signal) is inputted. Thereafter, when an instruction (signal) from the control unit 7 is inputted, the camera 2 and the rear emblem 3 are shifted to the imaging position.

The cleaning nozzle 6 is a device that corresponds to a nozzle device of the present invention and has an ejection outlet 61 through which cleaning liquid is ejected. The ejection outlet 61 is positioned so as to oppose the surface 3a of the rear emblem 3 at the cleaning position. That is, the ejection outlet 61 is disposed so as to apply cleaning liquid to the surface 3a of the rear emblem 3 at the cleaning position.

The cleaning nozzle 6 is a device structured to apply cleaning liquid to the surface 3a of the rear emblem 3 at the cleaning position. A conventional cleaning device is usable so as to be fixed to the vehicle at a predetermined position. Applying cleaning liquid means supplying cleaning liquid to the surface 3a of the rear emblem 3. That is, applying cleaning liquid means not only vigorously applying the cleaning liquid but also dropping cleaning liquid from the upper side, or supplying cleaning liquid such that the cleaning liquid flows along the surface 3a of the rear emblem 3.

For example, the cleaning nozzle 6 is a device that includes a nozzle body 62 having the ejection outlet 61 that is disposed so as to oppose the surface 3a of the rear emblem 3 at the cleaning position, and is opened for ejecting cleaning liquid, and a tank (not shown) that is disposed so as to connect to the ejection outlet 61 and that stores cleaning liquid. The cleaning nozzle 6 is allowed to further include an air ejection outlet for blowing off cleaning liquid adhering to the surface 3a by applying air after cleaning liquid is applied to the surface 3a of the rear emblem 3. The same opening is shared by the air ejection outlet and the ejection outlet 61 through which cleaning liquid is ejected. Alternatively, the air ejection outlet and the ejection outlet 61 are formed as different openings.

In the present embodiment, the cleaning nozzle 6 has the tank (not shown) and the nozzle body 62 fixed to the vehicle body 4, as shown in FIG. 2 to FIG. 3.

The nozzle body 62 has, at its end, a pipe-like end portion at which the ejection outlet 61 is opened. The nozzle body 62 is formed such that its end portion is bent downward, and the ejection outlet 61 is oriented substantially downward. In the nozzle body 62, the portion at which the end portion is bent downward is fixed at a position which is inward of the surface 4a of the vehicle body 4 and at which the ejection outlet 61 is opened above the surface 3a of the rear emblem 3 at the cleaning position.

The cleaning nozzle 6 is connected to the control unit 7. The control unit 7 controls the start and stop of the ejection so as to eject cleaning liquid in the tank through the ejection outlet 61. In the present embodiment, when an instruction (signal) from the control unit 7 is inputted to the cleaning nozzle 6, cleaning liquid in the tank is pressure-fed into the nozzle body 62, and ejected through the ejection outlet 61. When an instruction (signal) from the control unit 7 is inputted to the cleaning nozzle 6, pressure-feeding of the cleaning liquid in the tank into the nozzle body 62 is halted to stop (or end) ejection of the cleaning liquid.

Operation According to the Present Embodiment

Firstly, in the camera device 1 of the present embodiment, as shown in FIG. 1 to FIG. 3, the camera 2 and the rear emblem 3 are held at the imaging position. In this state, the camera 2 takes a video image of a portion behind the vehicle based on light transmitted through the rear emblem 3. The image (result of imaging) taken by the camera 2 is transmitted to the control unit 7, is further transmitted to a monitor as another device in the vehicle interior, and is displayed on the monitor.

During bad weather such as rainy weather, foreign matter such as mud sometimes adheres to the surface 3a of the rear emblem 3 which forms the outer peripheral surface of the vehicle. When a person in the vehicle interior perceives that there is foreign matter adhering to the surface 3a of the rear emblem 3, an instruction (signal) for cleaning is inputted to the control unit 7.

When the instruction (signal) for cleaning is inputted, the control unit 7 operates so as to start cleaning the camera device 1.

The control unit 7 transmits an instruction (signal) to the camera moving unit 5. When the instruction (signal) is inputted, the camera moving unit 5 operates the actuator 52 to shift the camera 2 and the rear emblem 3 from the imaging position to the cleaning position on the rear side in the imaging direction.

When the camera 2 and the rear emblem 3 have been shifted to the cleaning position, the control unit 7 transmits an instruction (signal) to the cleaning nozzle 6. The cleaning nozzle 6 to which the instruction (signal) is inputted from the control unit 7 pressure-feeds cleaning liquid into the nozzle body 62, to eject the cleaning liquid through the ejection outlet 61. The cleaning liquid ejected through the ejection outlet 61 is applied onto the surface 3a of the rear emblem 3. The foreign matter adhering to the surface 3a of the rear emblem 3 is washed away by the cleaning liquid due to the pressure of the applying, and is removed from the surface 3a.

Both the cleaning liquid applied to the surface 3a of the rear emblem 3 and the foreign matter adhering to the surface 3a of the rear emblem 3 flow along the surface 3a, drop down, and are discharged through the waste liquid flow path 43 to the outside of the vehicle without passing on the surface 4a of the vehicle body 4.

When the foreign matter adhering to the surface 3a of the rear emblem 3 has been removed, the control unit 7 transmits an instruction (signal) to the cleaning nozzle 6, to stop ejection of the cleaning liquid. Air is ejected through the air ejection outlet as necessary, thereby blowing off the cleaning liquid that remains on the surface 3a of the rear emblem 3.

Thereafter, the control unit 7 transmits an instruction (signal) to the camera moving unit 5, to shift the camera 2 and the rear emblem 3 from the cleaning position to the imaging position.

As described above, the camera device 1 of the present embodiment removes foreign matter adhering to the surface 3a of the rear emblem 3.

Effect of the Present Embodiment

The camera device 1 of the present embodiment includes the camera 2 that is mounted to a vehicle and receives visible light, the light-transmissive rear emblem 3 that is positioned so as to be fixed relative to the camera 2 on the front side in the imaging direction of the camera 2, the camera moving unit 5 mounted to the vehicle for causing the rear emblem 3 and the camera 2 to reciprocate between the imaging position at which the surface 3a of the rear emblem 3 is arranged along the surface 4a of the vehicle body 4, and the cleaning position at which the surface 3a of the rear emblem 3 is positioned rearward of the surface 4a of the vehicle body 4 in the imaging direction so as to be distant from the surface 4a of the vehicle body 4 over a predetermined distance, and the nozzle device 6 mounted to the vehicle for ejecting cleaning liquid toward the surface 3a of the rear emblem 3 when the rear emblem 3 is at the cleaning position.

In this structure, when the surface 3a of the rear emblem 3 is at the cleaning position, cleaning liquid ejected toward the surface 3a of the rear emblem 3 washes away and removes foreign matter adhering to the surface 3a of the rear emblem 3. When the cleaning liquid is applied, the surface 3a of the rear emblem 3 is positioned inward of the surface 4a of the vehicle body 4 inside the vehicle so as to be distant from the surface 4a of the vehicle body 4 over a predetermined distance. The cleaning liquid applied to the surface 3a of the rear emblem 3 flows downward from the surface 3a of the rear emblem 3 at the cleaning position. That is, since the cleaning liquid flows down at a position at which the surface 3a of the rear emblem 3 is distant from the surface 4a of the vehicle body 4, the cleaning liquid that flows down does not flow down directly onto the surface 4a of the vehicle body 4 and is inhibited from flowing along the surface 4a of the vehicle body 4. As a result, traces of the flow of the cleaning liquid are inhibited from remaining on the surface 4a of the vehicle body 4, and the cleaning liquid that flows down is inhibited from spoiling the outer appearance of the vehicle.

In the camera device 1 of the present embodiment, the cleaning position is rearward of the imaging position in the imaging direction. In this structure, when the surface 3a of the rear emblem 3 is at the cleaning position, the surface 3a of the rear emblem 3 is positioned inward of the surface 4a of the vehicle body 4 inside the vehicle so as to be distant from the surface 4a of the vehicle body 4, and the above-described effect is exerted.

Furthermore, since the cleaning position is rearward of the imaging position in the imaging direction, also when the camera 2 is at the cleaning position, a video image of a portion behind the vehicle is taken through the hole 41 of the body 4. That is, the surface 3a of the rear emblem 3 is cleaned without stopping taking a video image of the portion behind the vehicle.

In the camera device 1 of the present embodiment, the cleaning nozzle 6 is fixed to the vehicle in a portion inward of the surface 4a of the vehicle body 4. In this structure, the ejection outlet 61 is fixed relative to the vehicle, and cleaning liquid is assuredly applied to the surface 3a of the rear emblem 3 at the cleaning position.

In the camera device 1 of the present embodiment, the rear emblem 3 is a part of the garnish 42 of the vehicle. In this structure, the camera device 1 is mounted to the vehicle without degrading the design of the outer peripheral surface of the vehicle.

Embodiment 2

The present embodiment represents an on-vehicle camera device 1 having a structure shown in FIG. 4 to FIG. 8. Components which are not described specifically in the present embodiment are the same as those of the camera device 1 of embodiment 1.

Figure 4:
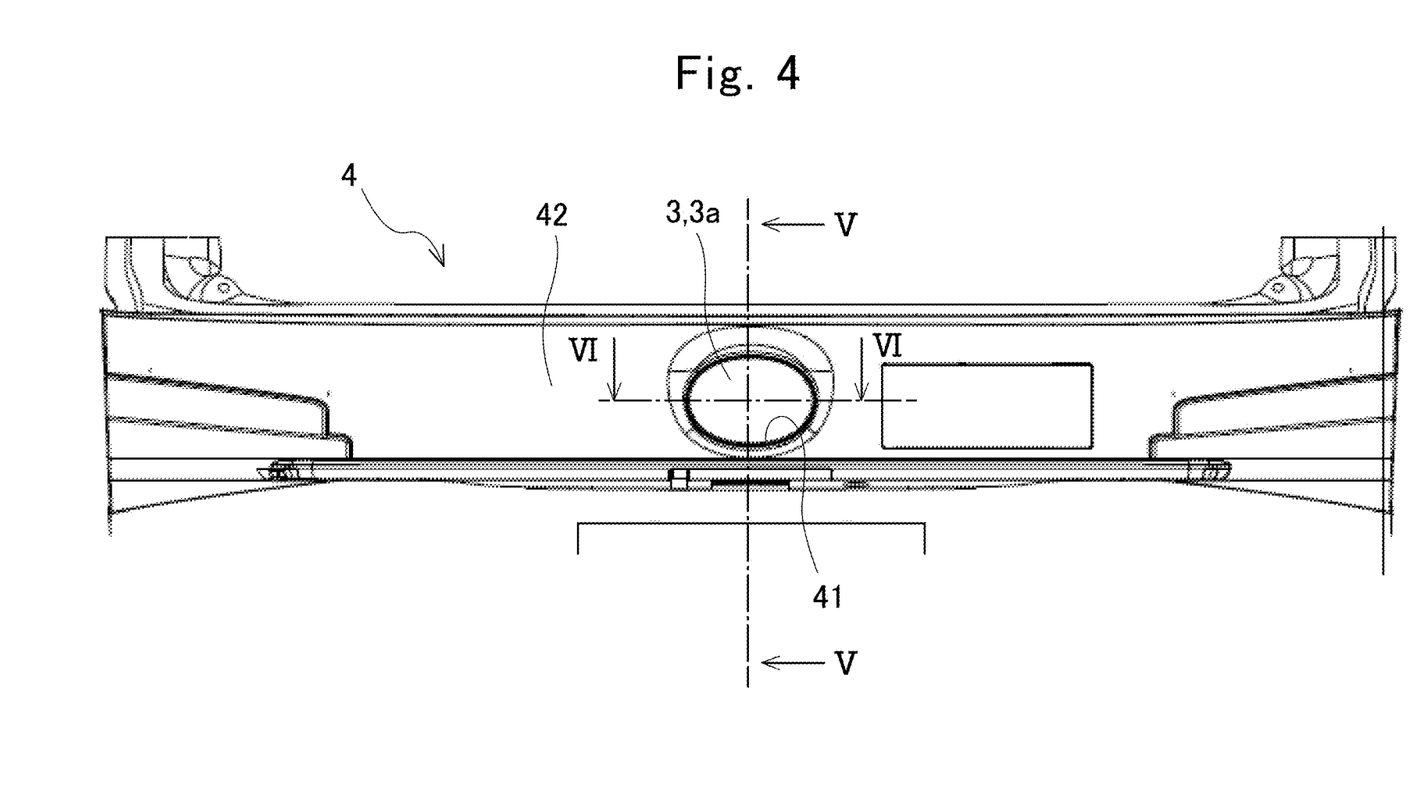
FIG. 4 is a rear view of a vehicle, illustrating a portion near a rear emblem of a vehicle to which a camera device according to embodiment 2 is mounted.
Figure 5:
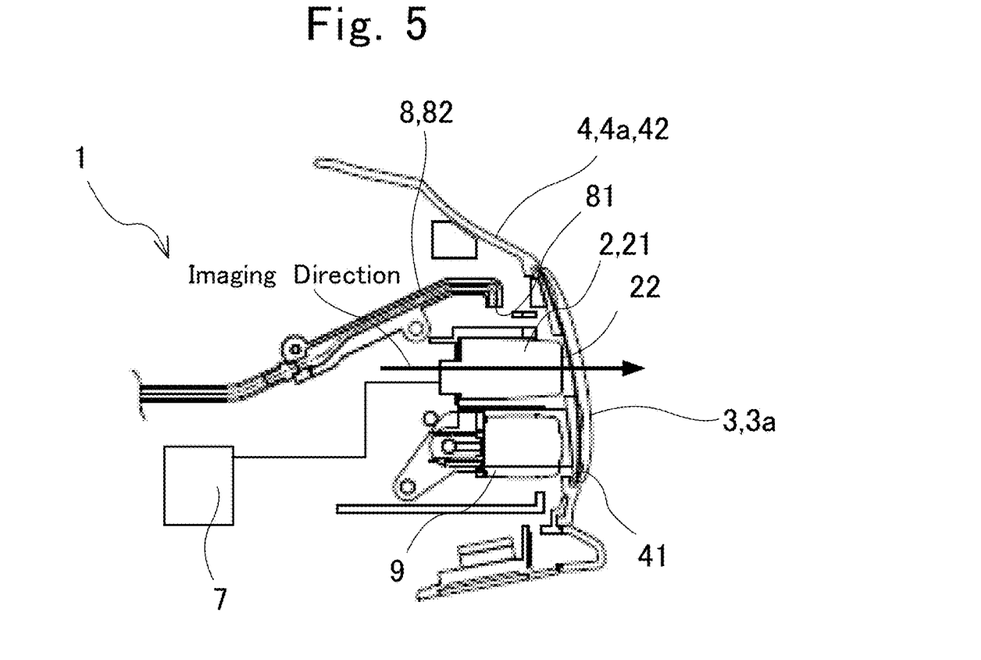
FIG. 5 is a sectional view as seen from the direction of arrows V-V in FIG. 4 when a camera of the camera device according to embodiment 2 is at an imaging position.

FIG. 4 is a rear view of a vehicle, illustrating a portion near a rear emblem of the vehicle to which the camera device 1 is mounted. FIG. 5 to FIG. 8 are each a cross-sectional view of a structure of the camera device 1 in the imaging direction. FIG. 5 and FIG. 7 are each a sectional view as seen from the direction of arrows V-V in FIG. 4.

Figure 6:
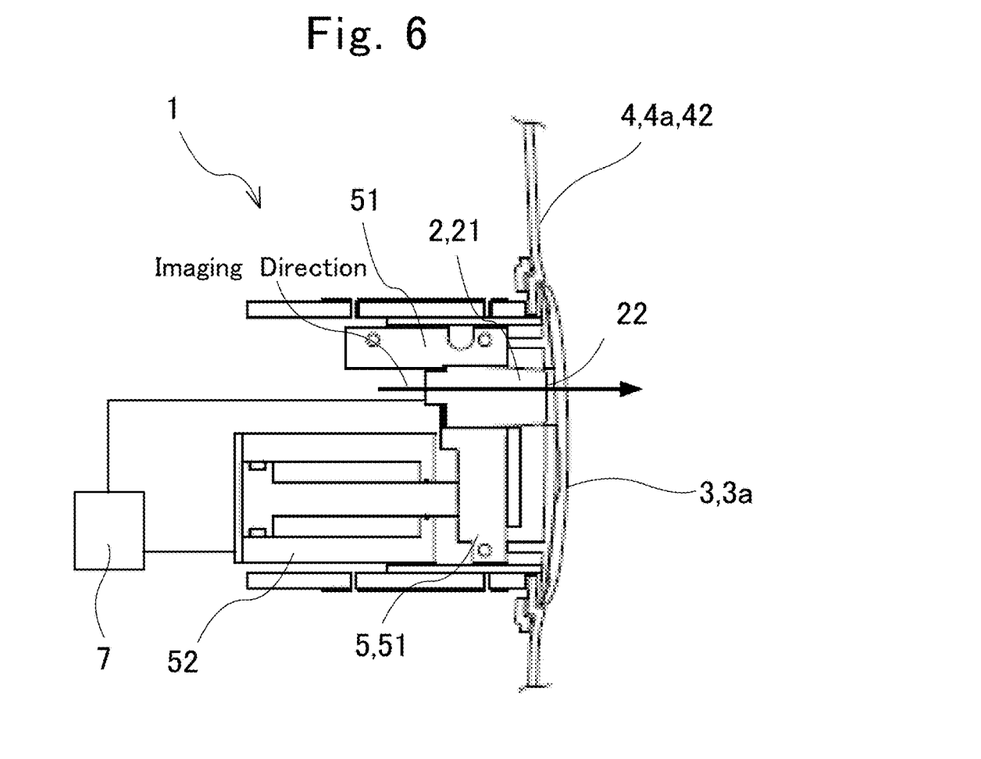
FIG. 6 is a sectional view as seen from the direction of arrows VI-VI in FIG. 4 when the camera of the camera device according to embodiment 2 is at the imaging position.
Figure 7:
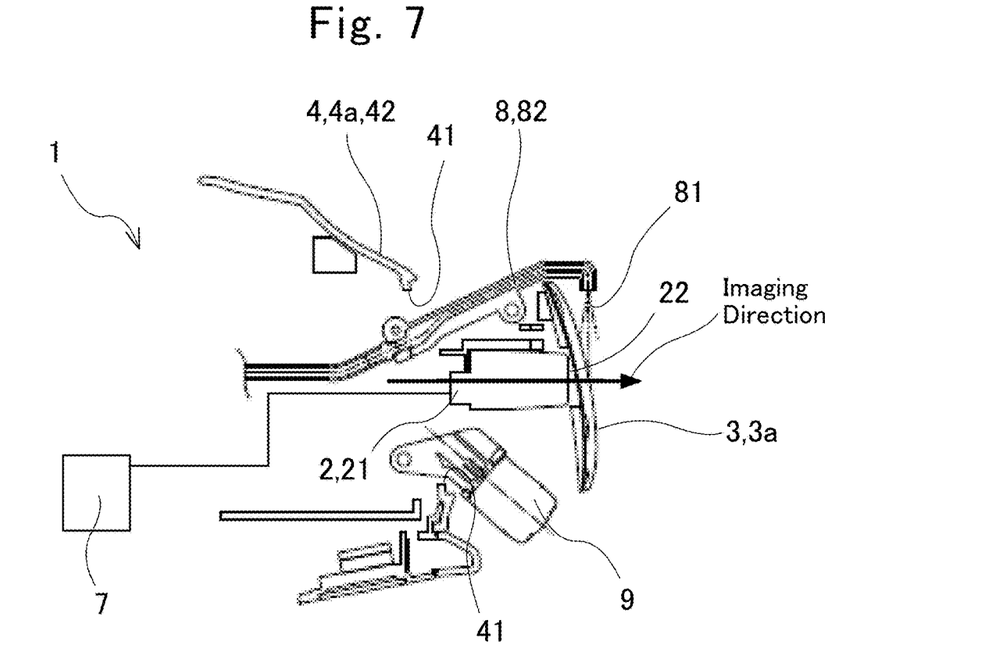
FIG. 7 is a sectional view as seen from the direction of arrows V-V in FIG. 4 when the camera of the camera device according to embodiment 2 is at a cleaning position.
Figure 8:
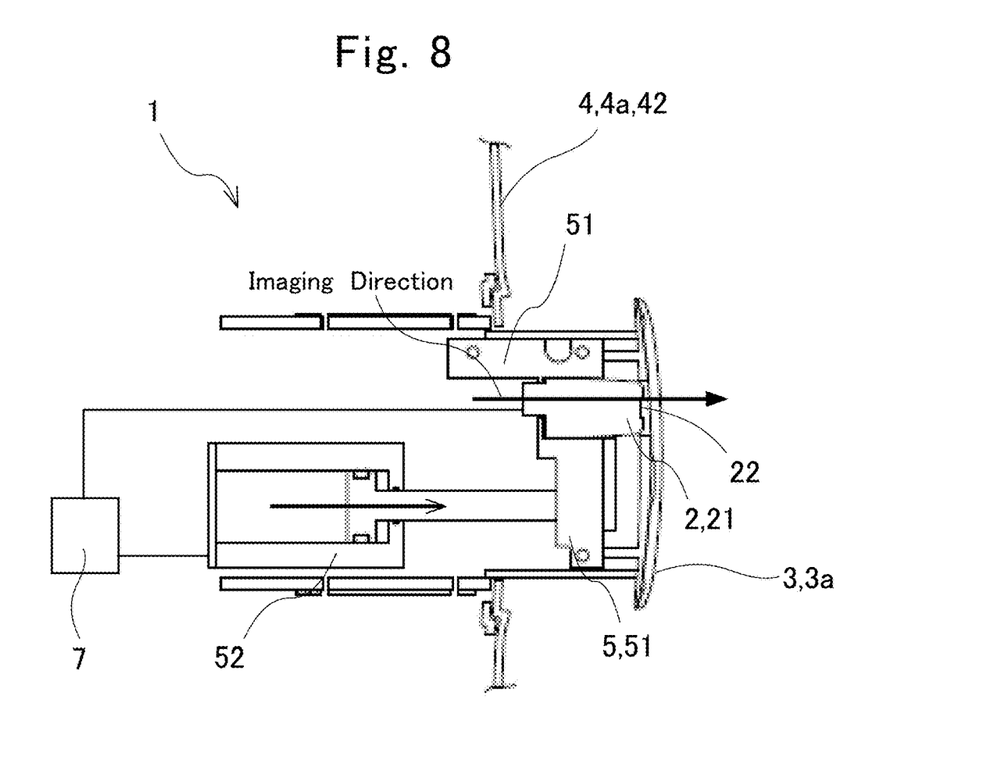
FIG. 8 is a sectional view as seen from the direction of arrows VI-VI in FIG. 4 when the camera of the camera device according to embodiment 2 is at the cleaning position.

FIG. 6 and FIG. 8 are each a sectional view as seen from the direction of arrows VI-VI in FIG. 4. FIG. 5 and FIG. 6 are each a cross-sectional view of the camera disposed at the imaging position as in FIG. 2. FIG. 7 and FIG. 8 are each a cross-sectional view of the camera disposed at the cleaning position as in FIG. 3.

The camera device 1 of the present embodiment includes the camera 2, the rear emblem 3, the body 4, the camera moving unit 5, a cleaning nozzle 8, the control unit 7, and a back camera 9. The camera device 1 of the present embodiment is disposed at the rear end portion of the vehicle as shown in FIG. 4 to FIG. 8 as in embodiment 1.

The camera 2, the rear emblem 3, and the vehicle body 4 have the same structures as described in embodiment 1.

In the present embodiment, when the rear emblem 3 is at the imaging position described below, the edge portion of the rear emblem 3 and the opening edge portion of the hole 41 are in close contact with each other on the side of the surface 4a of the vehicle body 4. Both the edge portion of the rear emblem 3 and the opening edge portion of the hole 41 are in close contact with each other in a liquid-tight state to inhibit water or foreign matter from passing therebetween.

The camera moving unit 5 moves the camera 2 and the rear emblem 3 between the imaging position and the cleaning position.

The imaging position is a position at which, as shown in FIG. 5 to FIG. 6, the rear emblem 3 is disposed on the side of the surface 4a of the vehicle body 4, and the surface 3a of the rear emblem 3 is arranged along the surface 4a of the vehicle body 4. At this position, the rear emblem 3 forms a part of the garnish 42 that decorates the outer peripheral surface of the vehicle.

The cleaning position is a position at which, as shown in FIG. 7 to FIG. 8, the surface 3a of the rear emblem 3 is positioned outward (that is, the front side in the imaging direction) of the surface 4a of the vehicle body 4 on the outer side of the vehicle so as to be distant from the surface 4a of the vehicle body 4 over a predetermined distance. The predetermined distance is set such that, when cleaning liquid applied to the surface 3a of the rear emblem 3 by the cleaning nozzle 8 described below flows down and drops from the surface 3a of the rear emblem 3, the cleaning liquid does not adhere to the surface 4a of the body 4. The predetermined distance is preferably set at least such that cleaning liquid does not adhere to a portion on the lower side of the opening edge portion that forms the opening of the hole 41 of the body 4.

The camera moving unit 5 has the same structure as that of embodiment 1 except that the cleaning position is on the front side in the imaging direction. That is, the camera moving unit 5 includes the camera holding member 51 and the actuator 52 as in embodiment 1.

The cleaning nozzle 8 is a device that corresponds to the nozzle device of the present invention and has an ejection outlet 81 through which cleaning liquid is ejected. The cleaning nozzle 8 includes a nozzle body 82, an actuator (not shown), and a tank (not shown) as shown in FIG. 6 to FIG. 7.

The nozzle body 82 is a member having the ejection outlet 81 that is disposed so as to oppose the surface 3a of the rear emblem 3 at the cleaning position, and is opened for ejecting cleaning liquid. The nozzle body 82 has, at its end, a pipe-like end portion at which the ejection outlet 81 is opened. The nozzle body 82 is formed such that its end portion is bent downward, and the ejection outlet 81 is oriented substantially downward. The nozzle body 82 is provided such that the position of the ejection outlet 81 is changeable by the actuator.

The actuator is a device that corresponds to a nozzle moving unit of the present invention, and changes the position of the nozzle body 82. The actuator operates so as to store the nozzle body 82 in a portion inward of the surface 4a of the vehicle body 4 inside the vehicle when the rear emblem 3 is at the imaging position. At this time, the end portion of the nozzle body 82 is held in a portion inward (the rear side in the imaging direction) of the rear emblem 3 inside the vehicle. The actuator operates so as to open the ejection outlet 81 of the nozzle body 82 at a position above the surface 3a of the rear emblem 3 when the rear emblem 3 is at the cleaning position. That is, the actuator moves the nozzle body 82 such that the end portion of the nozzle body 82 is disposed forward of the surface 3a of the rear emblem 3 in the imaging direction above the surface 3a of the rear emblem 3.

The tank has the same structure as that in embodiment 1.

The cleaning nozzle 8 is connected to the control unit 7. The control unit 7 controls the operation of the actuator. In the present embodiment, when an instruction (signal) is inputted from the control unit 7, the operation of the actuator is controlled such that (the end portion of) the nozzle body 82 is stored inside the vehicle body 4 or projects so as to be disposed forward of the surface 3a of the rear emblem 3 in the imaging direction above the surface 3a of the rear emblem 3. The control unit 7 performs control so as to eject cleaning liquid in the tank through the ejection outlet 81. The cleaning liquid in the tank is pressure-fed into the nozzle body 82, and ejected through the ejection outlet 81.

The back camera 9 takes a video image of a portion behind the vehicle similarly to the camera 2. In the present embodiment, the back camera 9 takes a video image when the vehicle moves backward (travels by a reverse gear). The back camera 9 is set such that its imaging direction is oriented downward as compared with the imaging direction of the camera 2.

The back camera 9 is fixed to an actuator (not shown), and is stored in a portion inward of the surface 4a of the vehicle body 4 similar to the cleaning nozzle 8 when the camera 2 and the rear emblem 3 are at the imaging position. When the camera 2 and the rear emblem 3 are at the imaging position, the position of the back camera 9 is changed so as to be oriented in a predetermined imaging direction.

In the present embodiment, the back camera 9 is stored in a portion inward of the surface 4a of the vehicle body 4 when the vehicle is traveling in the forward direction. When the vehicle moves backward (the reverse gear is selected), the back camera 9 is moved so as to be oriented in the predetermined imaging direction and exposed. In the present embodiment, the back camera 9 displays the result of imaging on a back monitor in the vehicle interior.

Operation According to the Present Embodiment

Firstly, the operation of the camera device 1 of the present embodiment will be described similarly to embodiment 1. In the camera device 1 of the present embodiment, as shown in FIG. 5 to FIG. 6, the camera 2 and the rear emblem 3 are held at the imaging position. In this state, the camera 2 takes a video image of a portion behind the vehicle based on light transmitted through the rear emblem 3. The image (result of imaging) taken by the camera 2 is transmitted to the control unit 7, is further transmitted to the monitor as another device in the vehicle interior, and is displayed on the monitor.

During bad weather such as rainy weather, foreign matter such as mud sometimes adheres to the surface 3a of the rear emblem 3 which forms the outer peripheral surface of the vehicle. When a person in the vehicle interior perceives that there is foreign matter adhering to the surface 3a of the rear emblem 3, an instruction (signal) for cleaning is inputted to the control unit 7.

When the instruction (signal) for cleaning is inputted, the control unit 7 operates so as to start cleaning the camera device 1.

The control unit 7 transmits an instruction (signal) to the camera moving unit 5. When the instruction (signal) is inputted, the camera moving unit 5 operates the actuator 52 to shift the camera 2 and the rear emblem 3 from the imaging position to the cleaning position on the front side in the imaging direction.

The control unit 7 further transmits an instruction (signal) to the cleaning nozzle 8. The cleaning nozzle 8 to which the instruction (signal) is inputted from the control unit 7 operates the actuator. The actuator changes the position of the nozzle body 82 from the position where (the end portion of) the nozzle body 82 is stored inside the vehicle body 4. The actuator changes the position of the nozzle body 82 to a position where (the end portion of) the nozzle body 82 projects forward of the surface 3a of the rear emblem 3 in the imaging direction above the surface 3a of the rear emblem 3.

When the camera 2 and the rear emblem 3 have been shifted to the cleaning position and the nozzle body 82 has been shifted to a predetermined position, the control unit 7 transmits an instruction (signal) to the cleaning nozzle 8. The cleaning nozzle 8 to which the instruction (signal) is inputted from the control unit 7 pressure-feeds cleaning liquid into the nozzle body 82, to eject the cleaning liquid through the ejection outlet 81. The cleaning liquid ejected through the ejection outlet 81 is applied onto the surface 3a of the rear emblem 3. The foreign matter adhering to the surface 3a of the rear emblem 3 is washed away by the cleaning liquid due to the pressure of the applying, and is removed from the surface 3a.

When the foreign matter adhering to the surface 3a of the rear emblem 3 has been removed, the control unit 7 transmits an instruction (signal) to the cleaning nozzle 8 to stop ejection of the cleaning liquid. Thereafter, an instruction (signal) is transmitted to the actuator. The actuator changes the position of the nozzle body 82 such that (the end portion of) the nozzle body 82 is stored inside the vehicle body 4.

Thereafter, the control unit 7 transmits an instruction (signal) to the camera moving unit 5, to shift the camera 2 and the rear emblem 3 from the cleaning position to the imaging position.

As described above, the camera device 1 of the present embodiment removes foreign matter adhering to the surface 3a of the rear emblem 3.

Effect of the Present Embodiment

The camera device 1 of the present embodiment includes the camera 2 that is mounted to a vehicle and receives visible light, the light-transmissive rear emblem 3 that is positioned so as to be fixed relative to the camera 2 on the front side in the imaging direction of the camera 2, the camera moving unit 5 mounted to the vehicle for causing the rear emblem 3 and the camera 2 to reciprocate between the imaging position at which the surface 3a of the rear emblem 3 is arranged along the surface 4a of the vehicle, and the cleaning position at which the surface 3a of the rear emblem 3 is positioned forward of the surface 4a of the vehicle body 4 in the imaging direction so as to be distant from the surface 4a of the vehicle body 4 over a predetermined distance, and the cleaning nozzle 8 having the ejection outlet 81 through which cleaning liquid is ejected toward the surface 3a of the rear emblem 3 when the rear emblem 3 is at the cleaning position.

In this structure, when the surface 3a of the rear emblem 3 is at the cleaning position, cleaning liquid ejected toward the cover washes away and removes foreign matter adhering to the surface 3a of the rear emblem 3. When the cleaning liquid is applied, the surface 3a of the rear emblem 3 is positioned outward of the surface 4a of the vehicle body 4 on the outer side of the vehicle so as to be distant from the surface 4a of the vehicle body 4 over a predetermined distance. The cleaning liquid applied to the surface 3a of the rear emblem 3 flows downward from the surface 3a of the rear emblem 3 at the cleaning position. That is, since the cleaning liquid flows down at a position at which the surface 3a of the rear emblem 3 is distant from the surface 4a of the vehicle body 4, the cleaning liquid that flows down is inhibited from flowing along the surface 4a of the vehicle body 4. As a result, traces of the flow of the cleaning liquid are inhibited from remaining on the surface 4a of the vehicle body 4, and the cleaning liquid that flows down is inhibited from spoiling the outer appearance of the vehicle.

In the camera device 1 of the present embodiment, the cleaning position is forward of the imaging position in the imaging direction. In this structure, when the surface 3a of the rear emblem 3 is at the cleaning position, the surface 3a of the rear emblem 3 is positioned outward of the surface 4a of the vehicle body 4 on the outer side of the vehicle so as to be distant from the surface 4a of the vehicle body 4, and the above-described effect is exerted.

Furthermore, since the cleaning position is forward of the imaging position in the imaging direction, cleaning liquid that drops from the surface 3a of the rear emblem 3 does not flow into the vehicle body 4, and traces of the cleaning liquid are inhibited from remaining on the inner side of the vehicle body 4.

Furthermore, since the cleaning position is forward of the imaging position in the imaging direction, also when the camera 2 is at the cleaning position, a video image of a portion behind the vehicle is taken by the camera 2. That is, the surface 3a of the rear emblem 3 is cleaned without stopping taking a video image of the portion behind the vehicle.

In the camera device 1 of the present embodiment, the ejection outlet 81 of the cleaning nozzle 8 is positioned inward of the surface 3a of the rear emblem 3 inside the vehicle when the rear emblem 3 is at the imaging position, and is shifted so as to oppose the surface 3a of the rear emblem 3 when the rear emblem 3 is at the cleaning position.

The cleaning nozzle 8 of the present embodiment includes the nozzle body 82 having the ejection outlet 81 through which cleaning liquid is ejected, and the actuator (nozzle moving unit) for moving the nozzle body 82 such that the ejection outlet 81 is positioned inward of the surface 4a of the vehicle body 4 when the rear emblem 3 and the camera 2 are at the imaging position, and the ejection outlet 81 is positioned so as to oppose the surface 3a of the rear emblem 3 when the rear emblem 3 and the camera 2 are at the cleaning position.

In the structures, (the nozzle body 82 of) the cleaning nozzle 8 is not exposed to the outer peripheral surface of the vehicle at a time other than the time for cleaning. That is, the design (outer appearance) of the vehicle is inhibited from being degraded.

In the camera device 1 of the present embodiment, the rear emblem 3 is a part of the garnish 42 of the vehicle. In this structure, the camera device 1 is mounted to the vehicle without degrading the design of the outer peripheral surface of the vehicle.

[Modifications]

In each of the above-described embodiments, foreign matter adhering to the surface 3a of the rear emblem 3 is removed. However, in the present invention, a member to which cleaning liquid is applied is not limited to the rear emblem 3. For example, the present invention is applicable also when the cover of the present invention forms a part of the garnish other than the rear emblem for the vehicle, or forms a lens cover disposed on the surface of the lens 22 of the camera 2. In the case of the lens cover, for example, the lens cover is integrated with the lens 22 of the camera 2.

Furthermore, in each of the above-described embodiments, the receiving/transmitting device of the present invention is applied to the camera device 1 having the camera 2 for taking an image of a portion behind the vehicle. However, the receiving/transmitting device of the present invention is also applicable to a device other than the camera device 1 as the receiver/transmitter for receiving visible light. For example, the receiving/transmitting device of the present invention is also applicable to a receiver/transmitter for receiving and transmitting invisible light such as a millimeter wave and an electromagnetic wave. In this case, the surface 3a of the rear emblem 3 corresponds to a surface of a cover which has transmitting properties for invisible light such as an electromagnetic wave which is received and transmitted by the receiving/transmitting device.

The camera 2 is also mounted at a position other than the position described for each of the above-described embodiments (in which the camera 2 is disposed above a number plate on a rear surface of a vehicle). The camera 2 is also disposed on the front surface, the rear surface, the side surface, or the roof of the vehicle. The camera 2 is also disposed at one or more of these positions.

Examples of the receiver/transmitter of the receiving/transmitting device according to the present invention include a millimeter wave radar, a LIDAR (Laser Imaging Detection and Ranging) device, a side camera, a front camera, a fender camera, a pillar camera, and a rear emblem camera. As the receiver/transmitter, one or more selected from these devices is usable.

Two or more kinds of the receiver/transmitters are also disposed at one mounting position. For example, a camera and a millimeter wave radar are mountable at one mounting position.

In each of the above-described embodiments, a member for holding the rear emblem 3 and the camera body 21 by the camera holding member 51 of the camera moving unit 5 so as to fix a distance between the rear emblem 3 and the camera body 21, is used. However, the present invention is not limited to such a structure. For example, the rear emblem 3 and the camera body 21 are held by different camera holding members, respectively. In this case, the actuators are provided for the holding members, respectively, or the two holding members are moved by one actuator. For example, when a plurality of holding members are disposed, the holding members are moved in conjunction with each other by an interlocking mechanism such as a link mechanism.

The holding member is, for example, a member for connecting and fixing the receiver/transmitter to the actuator or the link mechanism.

DESCRIPTION OF THE REFERENCE CHARACTERS

1: on-vehicle camera device
2: camera
21: camera body
22: lens
3: rear emblem
3a: surface
4: vehicle body
4a: surface
41: hole
42: garnish
43: waste liquid flow path
5: camera moving unit
51: camera holding member
52: actuator
6: cleaning nozzle
61: ejection outlet
62: nozzle body
7: control unit
8: cleaning nozzle
81: ejection outlet
82: nozzle body
9: back camera

The invention claimed is:

1. A receiving/transmitting device for a vehicle comprising:
   a receiver/transmitter mounted to the vehicle and configured to receive and/or transmit a radio wave;
   a transmissive cover configured to transmit the radio wave therethrough and positioned on a front side in a receiving/transmitting direction of the receiver/transmitter so as to be fixed relative to the receiver/transmitter;
   a receiver/transmitter moving unit mounted to the vehicle and configured to cause the cover and the receiver/transmitter to reciprocate between
      a receiving/transmitting position at which a surface of the cover is arranged along a surface of the vehicle, and
      a cleaning position at which the surface of the cover is positioned forward or rearward of the surface of the vehicle in the receiving/transmitting direction so as to be distant from the surface of the vehicle over a predetermined distance; and
   a nozzle device mounted to the vehicle and configured to eject cleaning liquid toward the surface of the cover when the receiver/transmitter is at the cleaning position.

2. The receiving/transmitting device for vehicle according to claim 1, wherein
   the cleaning position is rearward of the receiving/transmitting position in the receiving/transmitting direction.

3. The receiving/transmitting device for vehicle according to claim 2, wherein
   the nozzle device is fixed to the vehicle in a portion inward of the surface of the vehicle.

4. The receiving/transmitting device for vehicle according to claim 1, wherein
   the cleaning position is forward of the receiving/transmitting position in the receiving/transmitting direction.

5. The receiving/transmitting device for vehicle according to claim 4, wherein the nozzle device includes
- a nozzle body having an ejection outlet through which the cleaning liquid is ejected, and
- a nozzle moving unit for moving the nozzle body such that
  - the ejection outlet is disposed inward of the surface of the vehicle when the receiver/transmitter is at the receiving/transmitting position, and
  - the ejection outlet opposes the surface of the cover when the receiver/transmitter is at the cleaning position.

6. The receiving/transmitting device for vehicle according to claim 1, wherein
the receiver/transmitter moving unit has a holding member for holding the receiver/transmitter and the cover, and an actuator for moving the holding member.

7. The receiving/transmitting device for vehicle according to claim 1, wherein
the cover is an emblem of the vehicle.

* * * * *